(12) United States Patent
Zhu et al.

(10) Patent No.: US 11,212,040 B2
(45) Date of Patent: Dec. 28, 2021

(54) METHOD, DEVICE AND COMPUTER PROGRAM FOR DATA TRANSMISSION FEEDBACK IN A WIRELESS COMMUNICATION SYSTEM

(71) Applicant: Telefonaktiebolaget LM Ericsson (publ), Stockholm (SE)

(72) Inventors: Huaisong Zhu, Beijing (CN); Qianxi Lu, Beijing (CN); Zhan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/341,176

(22) PCT Filed: Oct. 13, 2016

(86) PCT No.: PCT/CN2016/101985
§ 371 (c)(1),
(2) Date: Apr. 11, 2019

(87) PCT Pub. No.: WO2018/068256
PCT Pub. Date: Apr. 19, 2018

(65) Prior Publication Data
US 2020/0162200 A1 May 21, 2020

(51) Int. Cl.
*H04L 1/18* (2006.01)
(52) U.S. Cl.
CPC .......... *H04L 1/1812* (2013.01); *H04L 1/1825* (2013.01); *H04L 1/1854* (2013.01)

(58) Field of Classification Search
CPC ....... H04L 5/0055; H04L 1/1896; H04L 1/18; H04L 1/1883; H04L 1/1858; H04L 1/189;
(Continued)

(56) References Cited

U.S. PATENT DOCUMENTS

| 8,700,968 B2 | 4/2014 | Pelletier et al. | |
| 2007/0097924 A1* | 5/2007 | Martinovich | H04W 36/30 370/332 |

(Continued)

FOREIGN PATENT DOCUMENTS

| CN | 101179363 A | 5/2008 |
| CN | 101208894 A | 6/2008 |

(Continued)

OTHER PUBLICATIONS

Author Unknown, "Technical Specification Group Radio Access Network; Evolved Universal Terrestrial Radio Access (E-UTRA); Base Station (BS) radio transmission and reception (Release 13)," Technical Specification 36.104, Version 13.5.0, 3GPP Organizational Partners, Sep. 2016, 207 pages.
(Continued)

*Primary Examiner* — Awet Haile
(74) *Attorney, Agent, or Firm* — Sage Patent Group

(57) ABSTRACT

Embodiments of the disclosure generally relate to data transmission feedback. A terminal device receives a data packet transmitted from one or more network devices of the plurality of network device and determine whether triggering a feedback based on one or more of the received data packet, the monitored network devices and a timer Y at the terminal device. Latency for feedback of data transmission can be reduced and reliability can be improved.

18 Claims, 8 Drawing Sheets

(58) Field of Classification Search
CPC ... H04L 1/1845; H04L 1/1819; H04L 1/1861; H04L 5/0035; H04L 5/0007; H04W 72/14; H04W 72/0413; H04W 72/1284; H04W 28/10; H04W 28/02
See application file for complete search history.

(56) References Cited

U.S. PATENT DOCUMENTS

| | | | |
|---|---|---|---|
| 2011/0110262 A1* | 5/2011 | Yu | H04L 1/0025 370/252 |
| 2012/0314648 A1* | 12/2012 | Zhang | H04L 1/1848 370/328 |
| 2013/0034014 A1 | 2/2013 | Jonsson et al. | |
| 2017/0064726 A1* | 3/2017 | Chen | H04L 1/1887 |
| 2019/0068331 A1* | 2/2019 | Lee | H04L 5/0055 |

FOREIGN PATENT DOCUMENTS

| | | |
|---|---|---|
| CN | 101730137 A | 6/2010 |
| CN | 101778455 A | 7/2010 |
| WO | 2016053451 A1 | 4/2016 |
| WO | 2016/148940 A1 | 9/2016 |

OTHER PUBLICATIONS

Guo, Xin, et al., "A Novel Virtual Hybrid ARQ Mechanism for Multi-Cell MBMS Transmission in Wireless Network," IEEE International Conference on Communications Technology and Applications (ICCTA2009), Beijing, 2009, pp. 702-706.

International Search Report and Written Opinion for International Patent Application No. PCT/CN2016/101985, dated Jul. 12, 2017, 9 pages.

Extended European Search Report issued in corresponding EP Application No. 16918816.6 dated Apr. 15, 2020, 07 Pages.

* cited by examiner

METHOD, DEVICE AND COMPUTER PROGRAM FOR DATA TRANSMISSION FEEDBACK IN A WIRELESS COMMUNICATION SYSTEM

This application is a 35 U.S.C. § 371 national phase filing of International Application No. PCT/CN2016/101985, filed Oct. 13, 2016, the disclosure of which is incorporated herein by reference in its entirety.

TECHNICAL FIELD

The non-limiting and example embodiments of the present disclosure generally relate to a technical field of wireless communications, and specifically to a method, device and computer program for data transmission feedback in a wireless communications system and related communication device.

BACKGROUND

This section introduces aspects that may facilitate a better understanding of the disclosure. Accordingly, the statements of this section are to be read in this light and are not to be understood as admissions about what is in the prior art or what is not in the prior art.

Wireless communication systems are advancing to provide good service quality, support a high data rate and keep up with the continuously increasing demand for wireless data traffic.

As a response to the increasing demand for wireless data traffic, hybrid automatic repeat-request, HARQ, operations has been designed and can be used for error control in wireless networks which is a link adaptation technique that can improve communications in current wireless networks. With HARQ, the receiver may detect an error in a message and automatically requests a retransmission of the message from the transmitter. In response to receiving the HARQ feedback, the transmitter retransmits the message until it is received correctly, unless the error persists.

A network, such as the fourth generation (4G) network, relies on the retransmission functionalities to avoid packet loss in the whole transmission path including the transport network and RAN network. Some example retransmission functionalities include Automatic Repeat Request (ARQ), Packet Data Convergence Protocol (PDCP) and Radio Link Control (RLC) and Hybrid Automatic Repeat Request (HARQ).

Fifth generation (5G) networks such as NR, New Radio, are supposed to provide diverse applications or services. With different Quality of Services (QoS) requirements, these mobile network services may be classified into several types of applications for example Ultra-Reliable and Low Latency Communication (URLLC) which could be used in automatic drive/automatic control and has strict QoS requirements, especially in terms of latency and reliability.

SUMMARY

Considering the above, there is a need to fulfil the requirements of data transmission for diverse application or services with different Quality of Services (QoS) requirements for example URLLC which requires the HARQ feedback shall be of high-reliability and low-latency.

In order to improve HARQ feedback in terms of high-reliability and low-latency, current available designs may include the ACK/NACK feedback repetition (maximum level of 6 aggregated subframes) and reduced processing delay between data and feedback as what 3GPP standard agrees. However, the design of ACK/NACK feedback repetition will cause unacceptable increase of uplink (UL) signaling overhead and the design of reduced processing delay between data and feedback cannot handle the added latency due to non-ideal backhaul link which will increase undesirable HARQ Round Trip Time (RTT). The conventional available designs are not efficient and fail to fulfil the requirement of data transmission feedback for diverse application or services brought by fifth generation (5G) networks such as URLLC service.

In order to solve at least part of the above problems, methods, devices and computer programs are provided in the present disclosure. In order to solve at least part of the above problems, methods, apparatuses and computer programs are provided in the present disclosure. It can be appreciated that embodiments of the present disclosure are not limited to URLLC scenario, but could be more widely applied to any application scenario where similar problems exist.

Various embodiments of the present disclosure mainly aim at providing methods, apparatuses and computer programs for data transmission feedback between a transmitter and a receiver, for example, for ultra-reliable and low latency communication (URLLC). Each of the transmitter and the receiver could be, for example, a network device or a terminal device. Other features and advantages of embodiments of the present disclosure will also be understood from the following description of specific embodiments when read in conjunction with the accompanying drawings, which illustrate, by way of example, the principles of embodiments of the present disclosure.

In a first aspect of the disclosure, there is provided a method implemented at a mobile device. The method includes: receiving a data packet transmitted from one or more network devices of the plurality of network devices; determining whether triggering a feedback based on one or more of the received data packet, the monitored network devices and a timer Y at the terminal device.

In one embodiment, before receiving the data packet transmitted from the one or more network devices of the plurality of network devices, receiving message from the network devices indicating the information of the network devices which will transmit the data packet to the terminal device.

In one embodiment, the method further includes: starting the timer Y after the data packet is received from one of the plurality of network devices.

In one embodiment, the method further includes: in response to detecting the timer Y expires, triggering the feedback.

In one embodiment, the method further includes: monitoring the one or more network devices, wherein the one or more network devices include the network devices indicated by the network to the terminal device via signaling as for the initial transmission or the network devices to which the terminal device has sent NACK for re-transmission.

In one embodiment, the method further includes: in response to detecting that the data packet has been received from all the monitored network devices by the terminal device, triggering the feedback.

In one embodiment, the method further includes: in response to detecting that the data packet has been received correctly, triggering the feedback.

In one embodiment, the method further includes: if triggering the feedback, where the feedback is NACK, sending NACK feedback if the adding latency due to HARQ RTT is allowable as it is still within overall latency requirement.

In one embodiment, the method further includes, if triggering the feedback, where the feedback is NACK, sending NACK feedback if the one or more network devices have channel quality which is above a pre-defined threshold.

In one embodiment, the method further includes, if triggering the feedback, where the feedback is ACK, sending ACK feedback if enough uplink, UL, resource is available, which is indicated by the network devices to the terminal device.

In a second aspect of the disclosure, there is provided a terminal device. The terminal device includes: a receiving unit configured to receive a data packet transmitted from one or more network devices of the plurality of network devices; a determining unit configured to determine whether triggering a feedback based on one or more of the received data packet, the monitored network devices and a timer Y at the terminal device.

In a third aspect of the disclosure, there is provided a terminal device. The terminal device includes: a processor and a storage medium, the storage medium containing instructions that, when executed on the processor, cause the terminal device to: receive a data packet transmitted from one or more network devices of the plurality of network devices; determine whether triggering a feedback based on one or more of the received data packet, the monitored network devices and a timer Y at the terminal device.

In a fourth aspect of the disclosure, there is provided a computer program. The instructions which, when executed on at least one processor, cause the at least one processor to carry out the method according to the first aspect of the disclosure.

According to the various aspects and embodiments as mentioned above, latency for feedback of data transmission can be reduced and reliability can be improved.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
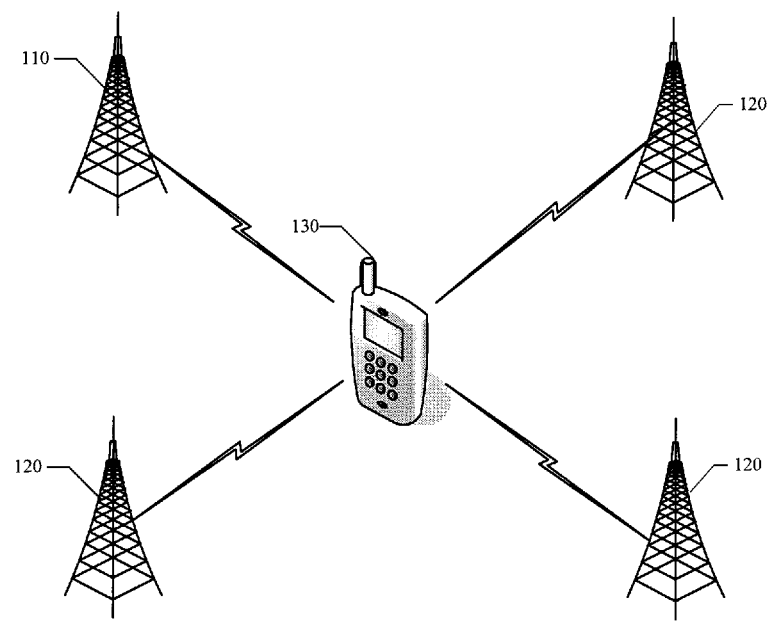
FIG. 1 shows an environment of a wireless communication network 100 in which embodiments of the present disclosure may be implemented.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards and may represent any type of communication, telecommunication, data, cellular, and/or radio network or other type of system, such as LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers a base station (BS), an access point (AP), a Mobile Management Entity (MME), Multi-cell/Multicast Coordination Entity (MCE), a gateway, a server, a controller or any other suitable device in the wireless communication network. The BS may be, for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

Yet further examples of network device include multi-standard radio (MSR) radio equipment such as MSR BSs, network controllers such as radio network controllers (RNCs) or base station controllers (BSCs), base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network device may represent any suitable device (or group of devices) capable, configured, arranged, and/or operable to enable and/or provide a terminal device access to the wireless communication network or to provide some service to a terminal device that has accessed the wireless communication network.

As used herein, "terminal device" refers to a device capable, configured, arranged and/or operable to communicate wirelessly with network device and/or another terminal device. Communicating wirelessly may involve transmitting and/or receiving wireless signals using electromagnetic signals, radio waves, infrared signals, and/or other types of signals suitable for conveying information through air. In particular embodiments, terminal devices may be configured to transmit and/or receive information without direct human interaction. For instance, a terminal device may be designed to transmit information to a network on a predetermined schedule, when triggered by an internal or external event, or in response to requests from the network. Generally, a terminal device may represent any device capable of, configured for, arranged for, and/or operable for wireless communication, for example radio communication devices. Examples of terminal devices include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a terminal device may represent a UE configured for communication in accordance with one or more communication standards promulgated by the 3$^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another specific example, in an Internet of Things (IOT) scenario, a terminal device may represent a machine or other device that performs monitoring and/or measurements, and transmits the results of such monitoring and/or measurements to another terminal device and/or a network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment that is capable of monitoring and/or reporting on its operational status or other functions associated with its operation.

A terminal device as described above may represent the endpoint of a wireless connection, in which case the device may be referred to as a wireless terminal. Furthermore, a terminal device as described above may be mobile, in which case it may also be referred to as a mobile device or a mobile terminal.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Now some exemplary embodiments of the present disclosure will be described below with reference to the figures. Reference is first made to FIG. 1, which illustrates an environment of a wireless communication network 100 in which embodiments of the present disclosure may be implemented. As shown in FIG. 1, the exemplary wireless communication network 100 includes a plurality of network devices 110, 120 and a terminal device 130 which is configured to be connected to the plurality of network devices 110, 120. Although FIG. 1 shows four network devices 110, 120 and one terminal device 130, it should be understood that the number of the network devices 110, 120 or the terminal device 130 as shown in FIG. 1 is only illustrative, but not limiting. For example, the wireless communication network 100 may include at least two network devices 110, 120 and at least one terminal device 130 served by the at least two network devices 110, 120, wherein at least one network device operates at a high frequency spectrum for example above 6 GHz. The first network device 110 and the second network device 120 can include, but not limited to, an eNodeB and the terminal device 130 can include, but not limited to, a user equipment, which may be, e.g., a machine type communication device. An example of such wireless communication network 100 is a millimeter wave based communication system.

In the multi-connectivity scenario as shown in FIG. 1, the terminal device 130 is configured to keep connection with more than one network device 110, 120 simultaneously so as to utilize diversity gain. The network devices 110, 120 involved in the multi-connectivity scenario may operate at the same RAT or different RATs. In a case where the network devices 110, 120 operate at the same RAT, the RAT can be, but not limited to, the RAT used for the 5G communication network. In another case where the network devices 110, 120 operate at different RATs, the RATs can be, but not limited to, the RAT used for the 5G communication network and the RAT used for the 4G communication network.

In such a multi-connectivity scenario as shown in FIG. 1, there is a need to fulfil the requirements of data transmission for diverse application or services with different Quality of Services (QoS) requirements for example URLLC which requires the feedback for transmission shall be of high-reliability and low-latency.

As for URLLC, the main requirement for HARQ feedback design includes two aspects:
1). the feedback shall be quick which is required by the low-latency requirement of URLLC traffic, especially considering HARQ is to provide diversity gain in time domain;
2). the feedback shall be reliable which is required by the ultra-reliable requirement of URLLC traffic, especially considering the miss-detection of NACK/DTX as ACK probability currently in a level of 10-2~10-3 [TS 36.104].

As for requirement 1) stated above, 3GPP has already agreed on reduced processing delay between data and feedback: corresponding acknowledgement reporting shortly (in the order of hundreds of μs) after the end of the downlink (DL) data transmission. For requirement 2), one design is the ACK/NACK repetition (maximum level of 6 aggregated subframes), which can in theory improve link level performance by 7.8 dB.

However, there are still limitations if these designs are applied into the HARQ framework for a multi-connectivity scenario: firstly, a straightforward method does not meet the latency target well, such as, reporting a single ACK/NACK report to the network (NW) as standardized reporting fashion to primary cell, PCell, node would increase undesirable HARQ RTT because non-ideal backhaul link takes considerable time in forwarding the ACK/NACK feedback to the appropriate network node; secondly, considering ultra-reliability QoS requirement, an increase of time-domain redundancy (e.g., using the ACK/NACK repetition design) is needed for enhancing ACK/NACK feedback reliability, in such a sense, the current fashion such as reporting to every network nodes (HARQ process is independent between network device) may cause unacceptable increase of UL signaling overhead which should be avoided.

Besides of the above problems, the feedback design has to adapt with the scheduler independency of the network devices, assumed in the multi-connectivity scenario. In other words, the timing of DL transmissions from different network devices are decided independently.

In order to solve at least part of the above problems, various embodiments of the present disclosure aim to provide an efficient HARQ design for high-reliability and low-latency wireless communications, such as URLLC. Although embodiments are described herein with reference to URLLC scenario, it can be appreciated that embodiments of the present disclosure are not limited to URLLC scenario, but could be more widely applied to any application scenario where similar problems exist.

It is to be understood that the configuration of FIG. 1 is described merely for the purpose of illustration, without suggesting any limitation as to the scope of the present disclosure. Those skilled in the art will appreciate that the wireless communication network 100 may include any suitable number of terminal devices and network devices and may have other suitable configurations, and each network device may provide any suitable number of carriers or cells.

Figure 2:
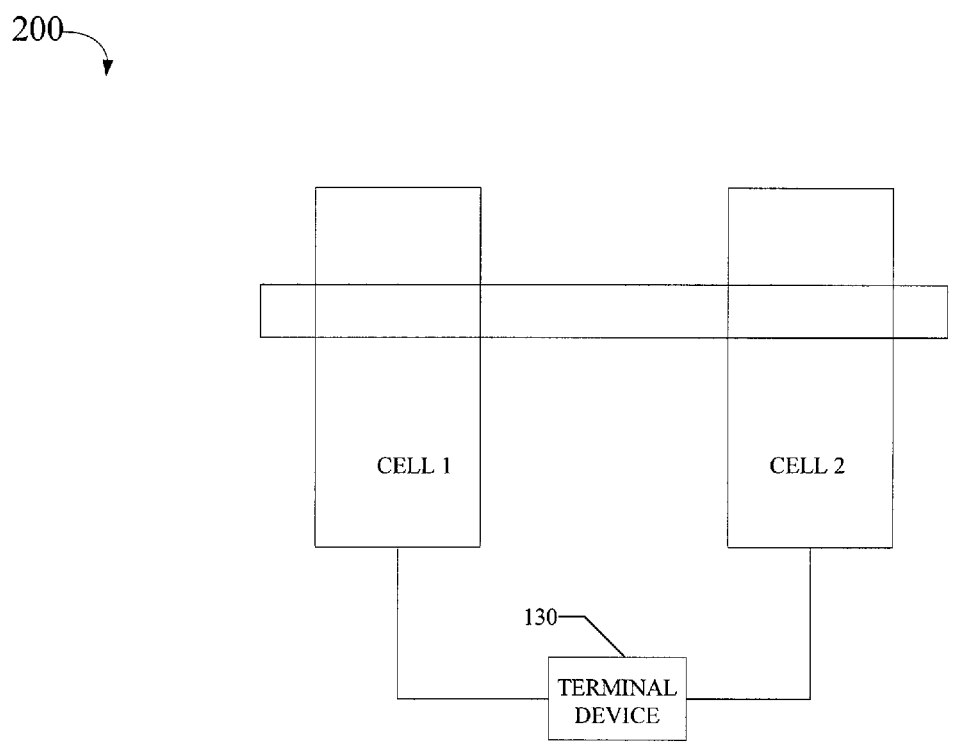
FIG. 2 shows a logic process 200 of HARQ at multi-connectivity scenario.

Reference is then made to FIG. 2, which briefly illustrates logic process of multi-connectivity scenario. A terminal device 130 is connected to a number of cells served by a plurality of network devices 110 120. The terminal device 130 receives a data packet from network device 110, then search for the same data packet from one or more second network devices 120 of the plurality of network devices for soft combination. When the terminal device 130 succeeds in decoding the received data packet, the HARQ indicator indicates ACK (ACKnowledgement). When the terminal device 130 fails to decode received data, the HARQ indicator indicates NACK (Negative ACKnowledgement). This design enables the terminal device 130 to perform soft combination when being connected to more than one network device 120 simultaneously.

Figure 3:
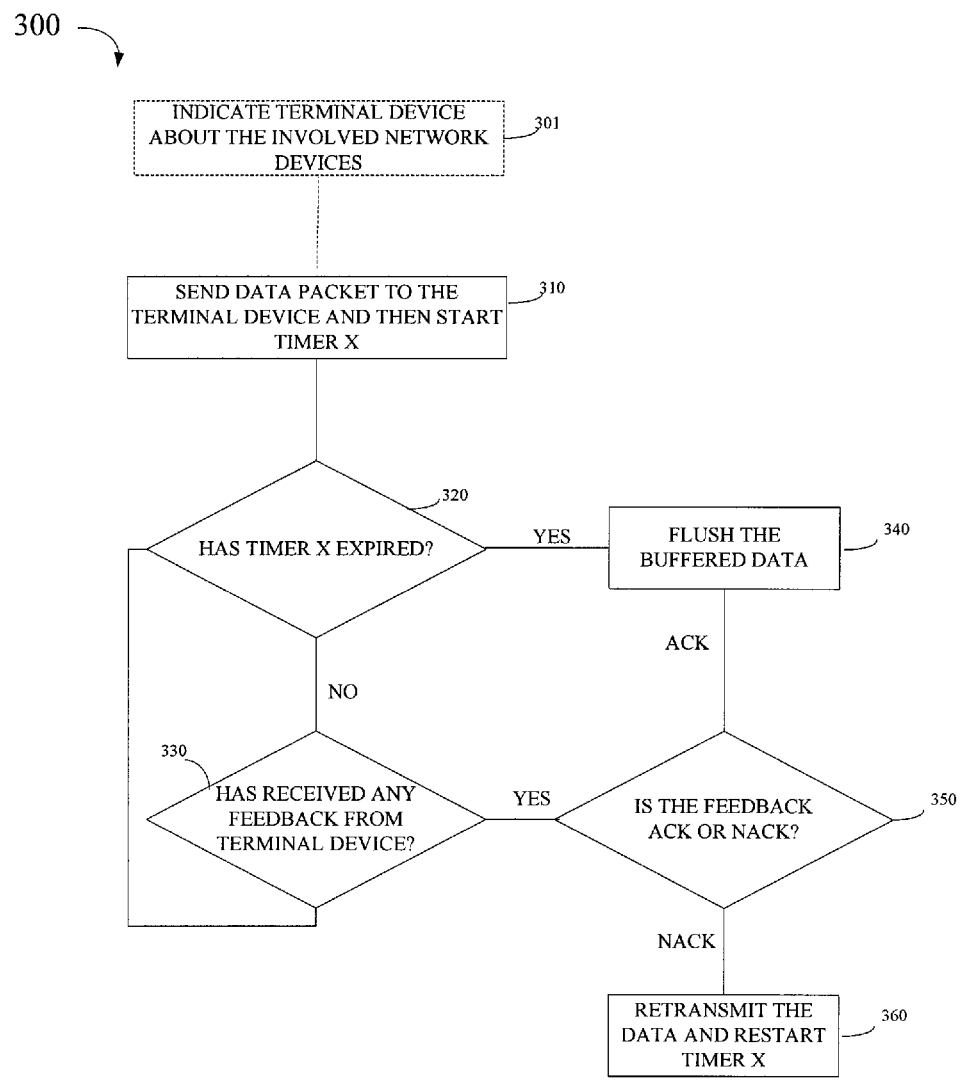
FIG. 3 shows a flowchart of a method 300 at a network device in accordance with an embodiment of the present disclosure.

FIG. 3 shows a flowchart of a method 300 implemented at a network device in accordance with an embodiment of the present disclosure. With the method 300, the above and other potential deficiencies in the conventional approaches can be overcome. It would be appreciated that the method 300 may be implemented by a device, such as the network device 110 or other suitable devices. For the purpose of illustration, the method 300 will be described below with reference to the network device 110 120 in the wireless communication system 100.

The method 300 is entered in block 310, where a data packet is sent to the terminal device 130 and then a timer X is started.

In block 320, where it's detected whether the timer X expired, if no, the method proceeds to the block 330 where it's detected whether any feedback is received from the terminal device 130; if yes, then proceeds to the block 340 where the buffed data is flushed. As for block 330, if it's detected that there is feedback received from the terminal device 130, the method proceeds to block 350 where it's detected whether the received feedback is ACK or NACK. If the received feedback is ACK, the method proceeds to the block 340, otherwise proceeds to the block 360 where the network device retransmits the data packet and restarts the timer X. If it's detected that there is no feedback received from the terminal device 130 at block 330, then the method proceeds to block 320. There is an optional block 301 where the network devices 110 120 indicates the involved network devices to the terminal device, which however is not mandatory for every packet, as an example the block 301 is not needed if the configuration is not changed since last transmission. This indication can be done via either DCI, or MAC CE or RRC signaling. The optional block 301 may proceed to block 310. It is also to be understood that the numbers of the blocks, such as 310, 320, 330, 340 and 350, do not mean to set limitations on the sequence order of the blocks and the sequence order of the blocks can be varied depending on circumstances.

The value of the timer X could be set to be large as long as it is within the latency requirement for the traffic, but also to be small considering the buffer size of the network device. The value of X can be set according to end-to-end latency requirement of the service which is being delivered by network to UE, e.g., assuming 50 ms end-to-end delay and 20 ms delay is allowed for packet delivery within core network, then X can be set as 30 ms. If the timer X has not expired yet, the network devices 110 120 would decide on re-transmission or not based on whether/what feedback is received from the terminal device 130.

Figure 4:
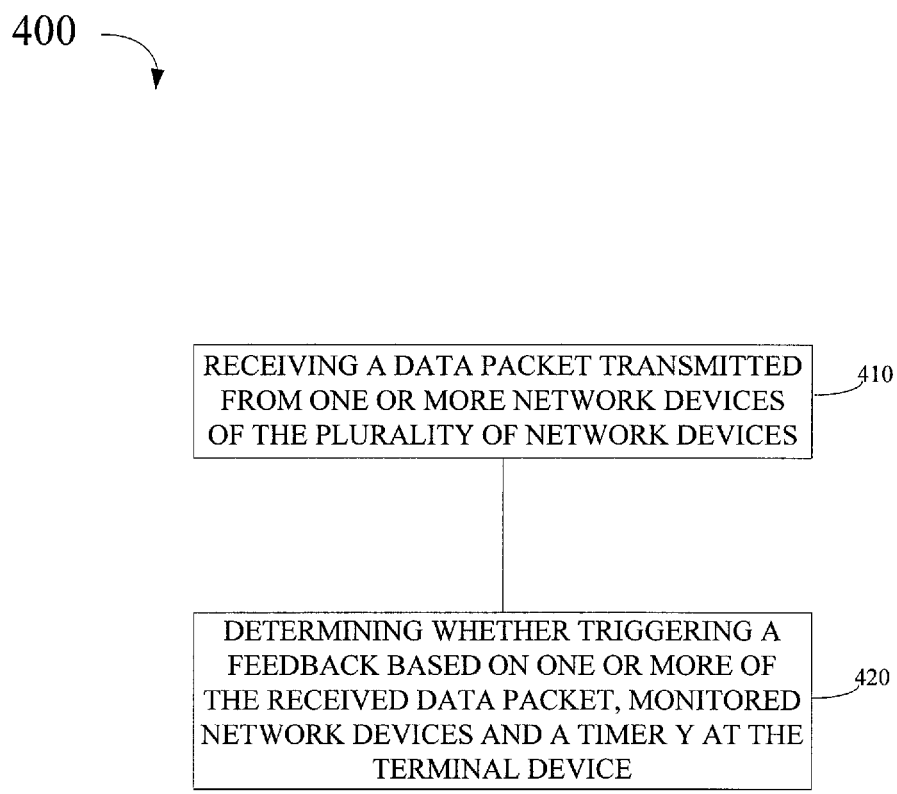
FIG. 4 shows a flowchart of a method 400 at a terminal device in accordance with an embodiment of the present disclosure.

Now some example embodiments will be described with respect to FIG. 4. FIG. 4 shows a flowchart of a method 400 for data transmission feedback implemented at a terminal device in accordance with an embodiment of the present disclosure. With the method 400, the above and other potential deficiencies in the conventional approaches can be overcome. It would be appreciated that the method 400 may be implemented by a device, such as the terminal device 130 or other suitable devices. For the purpose of illustration, the method 400 will be described below with reference to the terminal device 130 in the wireless communication system 100.

The method 400 is entered in block 410, where the terminal device 130 receives a data packet transmitted from one or more network devices of the plurality of network devices (120, 130); then the method proceeds to block 420 where the terminal device 130 determines whether triggering a feedback based on one or more of the received data packet, the monitored network devices and a timer Y at the terminal device (110). By detecting on one or more of the received data packet, the monitored network devices and a timer Y, the terminal device 130 then determines whether triggering a feedback. In some examples, the terminal device 130 does not trigger the feedback for the data transmission if the data packet is received correctly, or re-transmission which is not beneficial due to bad channel quality of the monitored network devices.

In some embodiments, The ACK/NACK feedback would be triggered if one or more of the following conditions are satisfied: the data packet has been already received correctly at the terminal device 130, all the monitored network devices 110 120 have sent the data packet to the terminal device 130, the timer Y expires. Otherwise, the ACK/NACK feedback would not be triggered. The timer Y expires means that the terminal device 130 does not continue the monitoring of the monitored network devices even if no data transmission is received from the network devices 110 120, either due to the terminal device 130 has missed the DL control channel, or the scheduler of the corresponding network devices 110 120 fail to schedule the data in time. As an example, the value of the timer Y could be less than the timer X.

Figure 5:
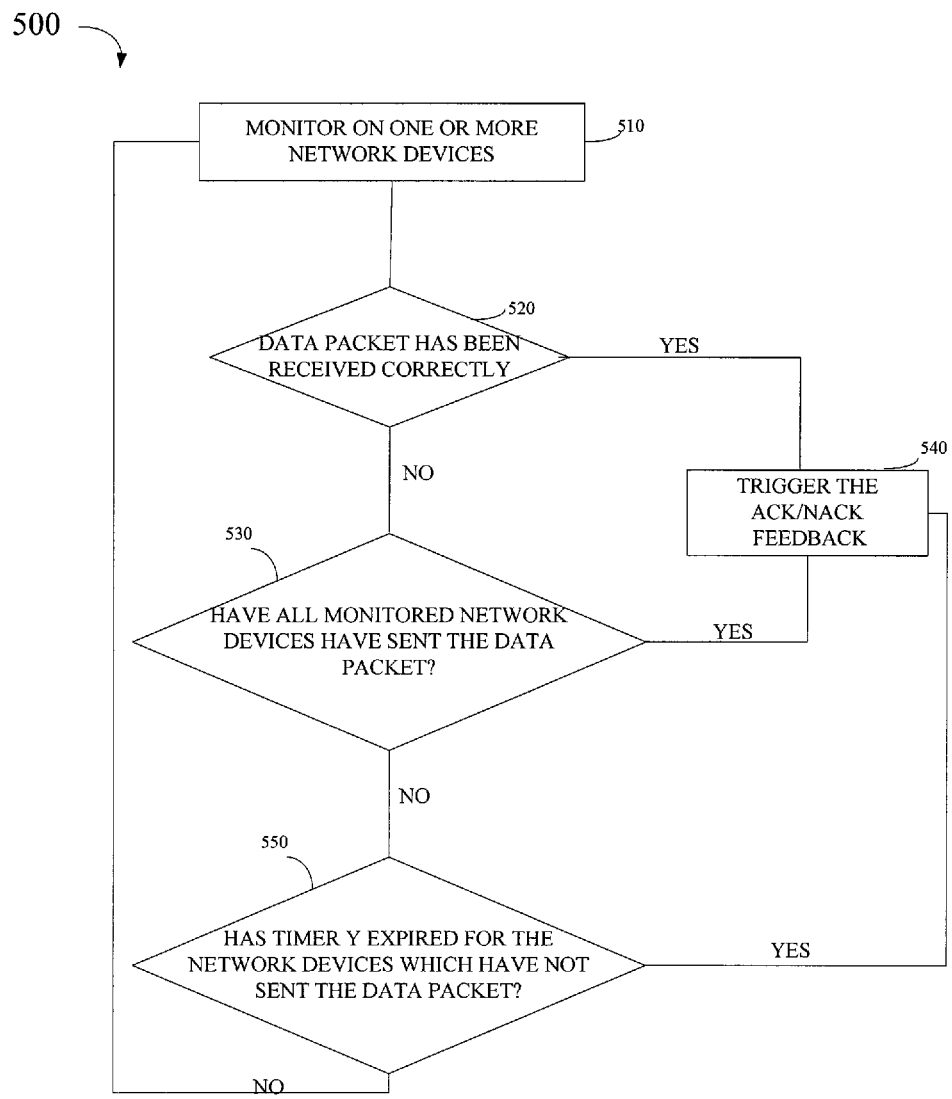
FIG. 5 shows a flowchart of a method 500 at a terminal device in accordance with an embodiment of the present disclosure.

Now some example embodiments will be described with respect to FIG. 5. FIG. 5 shows a flowchart of a method 500 for data transmission feedback implemented at a terminal device in accordance with an embodiment of the present disclosure. It would be appreciated that the method 500 may be implemented by a device, such as the terminal device 130 or other suitable devices. For the purpose of illustration, the method 500 will be described below with reference to the terminal device 130 in the wireless communication system 100.

The method 500 is entered in block 510, where the terminal device 130 monitors one or more network devices 110 120, wherein the one or more network devices include the network devices indicated by the network to the terminal device via signaling as for the initial transmission or the network devices to which the terminal device 130 has sent NACK for re-transmission. Then the method proceeds to block 520 where it's detected whether the data packet is received correctly or not. If yes, the method proceeds to block 540 where the terminal device 130 triggers an ACK/NACK feedback. If no, the method proceeds to block 530 where it's detected whether all the monitored network devices 110 120 have sent the data packet. If it's detected that all the monitored network devices 110 120 have sent the data packet, the method proceeds to block 540, otherwise the method proceeds to block 550 where it's detected whether a timer Y at the terminal device 130 expires for the network devices which have not sent the data packet. If it's detected that the timer Y at the terminal device 130 expires for the network devices which have not sent the data packet, the method proceeds to block 540, otherwise the method proceeds to block 510. It is also to be understood that the numbers of the blocks, such as 510, 520, 530, 540 and 550, do not mean to set limitations on the sequence order of the blocks and the sequence order of the blocks can be varied depending on circumstances.

In an embodiment, in block 540 the terminal device 130 triggers an ACK/NACK feedback if the maximum HARQ re-transmission number in NR has not reached.

Figure 6:
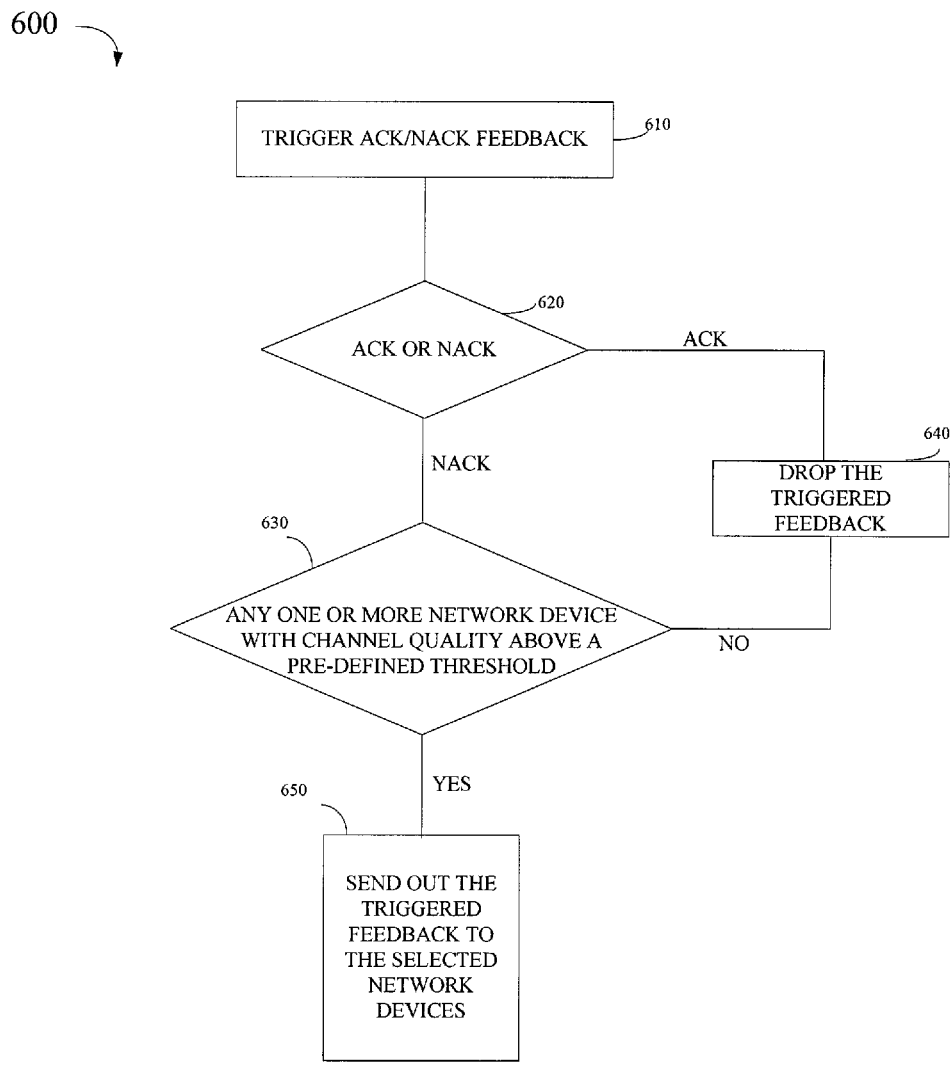
FIG. 6 shows a flowchart of a method 600 at a terminal device in accordance with an embodiment of the present disclosure.

Now some example embodiments will be described with respect to FIG. 6. FIG. 6 shows a flowchart of a method 600 for data transmission feedback implemented at a terminal device in accordance with an embodiment of the present disclosure.

The method 600 is entered in block 610, where the terminal device 130 triggers the ACK/NACK feedback. The method proceeds to block 620 where it's detected whether the feedback is an ACK or NACK. If it's detected that the feedback is an ACK, the method proceeds to block 640 where the triggered feedback is dropped. If it's detected that the feedback is a NACK, the method proceeds to block 630 where it's detected whether there are any monitored network devices with channel quality above a predetermined threshold. If it's detected that there are at least one any monitored network devices with channel quality above a pre-defined threshold, the method proceeds to block 650 where the terminal device 130 sends out the triggered feedback to the network devices with the channel quality. It is also to be understood that the numbers of the blocks, such as 610, 620, 630, 640 and 650, do not mean to set limitations on the sequence order of the blocks and the sequence order of the blocks can be varied depending on circumstances.

In an embodiment, if an ACK/NACK feedback is triggered, the feedback is sent out if the feedback is a NACK triggered and there is at least one network device 110 120 whose channel quality (RSRP, RSRQ or SINR and etc) is above a pre-defined threshold. Otherwise, the feedback is dropped.

In an embodiment, if the feedback is an ACK, the feedback is sent out where enough UL resource is available which can be configured by the network and indicated to the terminal device 130.

In an embodiment, if the feedback is an NACK and there is at least one network device 110 120 whose channel quality (RSRP, RSRQ or SINR and etc) is above a pre-defined threshold, the feedback is not sent out or dropped due to the increased delay due to another RTT is not within the end to end (E2E) delay requirement.

Figure 7:
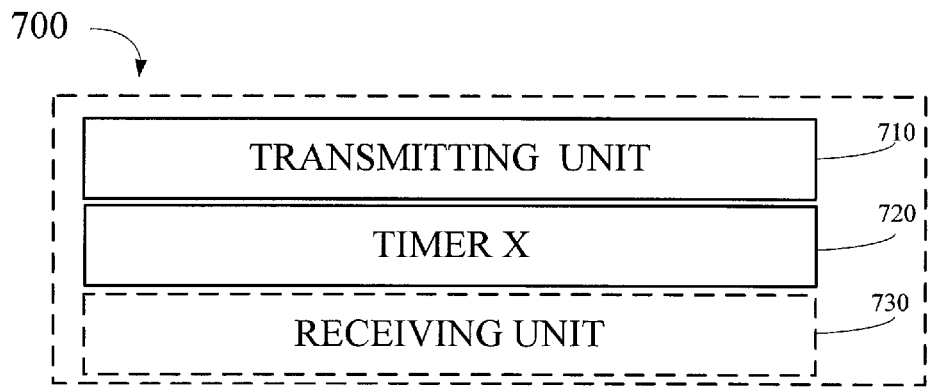
FIG. 7 shows a block diagram of a network device 700 in accordance with an embodiment of the present disclosure.

As shown in FIG. 7, the network device 700 includes a transmitting unit 710 and timer X 720. The transmitting unit 710 is configured to transmit a data packet to the terminal device 130 which receives the same data packet from one or more second network devices 110 120 of the plurality of network devices. The timer X 720 starts after the transmitter 710 transmits the data packet. Alternatively, or in addition, the network device 700 includes a receiving unit 730.

In an embodiment, the transmitting unit 710 is further configured to, transmit message to the terminal device 130 indicating the information of the one or more second network devices 110 120 which transmit the same data packet to the terminal device 130. As an example, the transmitting unit 710 transmits message to the terminal device 130 indicating the information of the one or more second network devices 110 120 which transmit the same data packet to the terminal device 130 before transmitting the same data packet to the terminal device 130.

In an embodiment, the value of the timer X is decided based on the latency requirement of the activated traffic flow.

In an embodiment, the timer X stops when an ACK/NACK feedback reception is received at the network device 110 from the terminal device 130.

Figure 8:
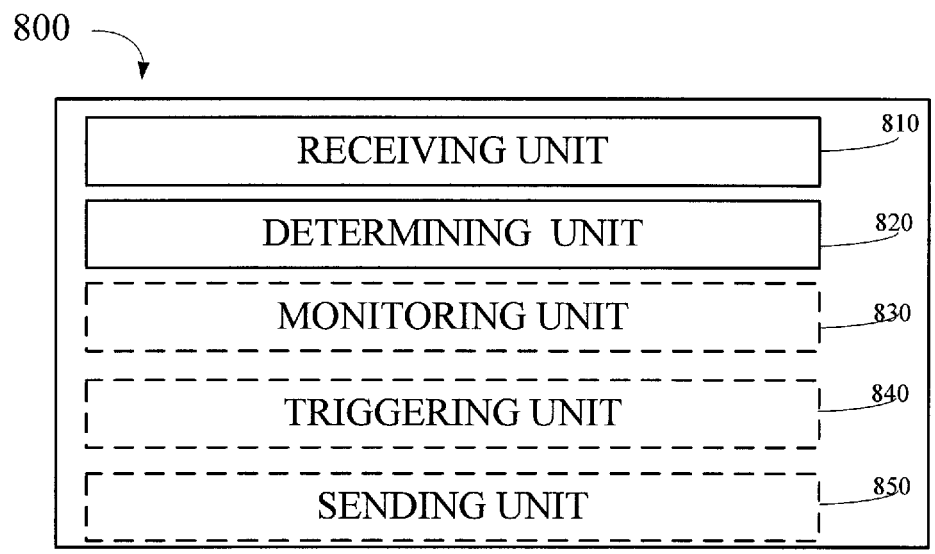
FIG. 8 shows a block diagram of a terminal device 800 in accordance with an embodiment of the present disclosure.

As shown in FIG. 8, the terminal device 800 includes a receiving unit 810 configured to receive a data packet transmitted from one or more network devices of the plurality of network devices 110, 120, a determining unit 820 configured to determine whether triggering a feedback based on one or more of the received data packet, the monitored network devices and a timer Y at the terminal device 130.

In an embodiment, the receiving unit 810 is further configured to, before receiving the data packet transmitted from the one or more network devices of the plurality of network devices, receive message from the network devices 110 120 indicating the information of the network devices which will transmit the data packet to the terminal device 130.

In an embodiment, the timer Y starts after the data packet is received from one of the plurality of network devices.

In an embodiment, the terminal device 130 further includes a monitoring unit 830, configured to monitor the one or more network devices, wherein the one or more network devices include the network devices indicated by the network to the terminal device via signaling as for the initial transmission or the network devices to which the terminal device has sent NACK for re-transmission.

In an embodiment, the terminal device 130 further includes a triggering unit 840, configured to trigger the feedback in response to any one of detecting the timer Y expires, detecting that the data packet has been received from all the monitored network devices by the terminal device and detecting that the data packet has been received correctly.

In an embodiment, the terminal device 130 further includes a sending unit 850, configured to, send NACK feedback, where the trigger unit triggers the feedback and the feedback is NACK, if the adding latency due to HARQ RTT is allowable as it is still within overall latency requirement; or send NACK feedback, where the triggering unit 840 triggers the feedback and the feedback is NACK, if the one or more network devices have channel quality which is above a pre-defined threshold; or send ACK feedback, where the triggering unit 740 triggers the feedback and the feedback is ACK, if enough uplink, UL, resource is available which is indicated by the network devices to the terminal device.

In an embodiment, the sending unit 850 is further configured to sending the ACK or NACK feedback to the network devices whose channel quality is above a pre-defined threshold.

It should be appreciated that components included in the apparatus 700 correspond to the operations of the methods 300, and components included in the apparatus 800 correspond to the operations of the methods 400, 500 and 600. Therefore, all operations and features described above with reference to FIG. 3 are likewise applicable to the components included in the apparatus 700 and have similar effects, and all operations and features described above with reference to FIGS. 4, 5 and 6 are likewise applicable to the components included in the apparatus 800 and have similar effects. For the purpose of simplification, the details will be omitted.

The components included in the apparatuses 700 and 800 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the components included in the apparatuses 700 and 800 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

In accordance with embodiments of the present disclosure, there is provided an apparatus implemented at a network device. The apparatus includes: means for transmitting a data packet to the terminal device which receives the same data packet from one or more second network devices of the plurality of network devices, a timer starts after the means for transmitting transmits the data packet.

In accordance with embodiments of the present disclosure, there is provided an apparatus implemented at a terminal device. The apparatus includes: means for receiving data packet transmitted from one or more network devices of the plurality of network devices, means for determining unit configured to determine whether triggering a feedback based on one or more of the received data packet, the monitored network devices and a timer Y at the terminal device.

In an embodiment, the means for receiving: means for, before receiving the data packet transmitted from the one or more network devices of the plurality of network devices, receiving message from the network devices indicating the information of the network devices which will transmit the data packet to the terminal device.

In an embodiment, the terminal device further includes the means for monitoring the one or more network devices, wherein the one or more network devices include the network devices indicated by the network to the terminal device via signaling as for the initial transmission or the network devices to which the terminal device has sent NACK for re-transmission.

In an embodiment, the terminal device further includes the means for triggering the feedback in response to any one of detecting the timer Y expires, detecting that the data packet has been received from all the monitored network devices by the terminal device and detecting that the data packet has been received correctly.

In an embodiment, the terminal device further includes the means for send NACK feedback, where the triggering unit triggers the feedback and the feedback is NACK, if the adding latency due to HARQ RTT is allowable as it is still within overall latency requirement; or send NACK feedback, where the triggering unit triggers the feedback and the feedback is NACK, if the one or more network devices have channel quality which is above a pre-defined threshold; or send ACK feedback, where the triggering unit triggers the feedback and the feedback is ACK, if enough uplink, UL, resource is available which is indicated by the network devices to the terminal device.

Figure 9:
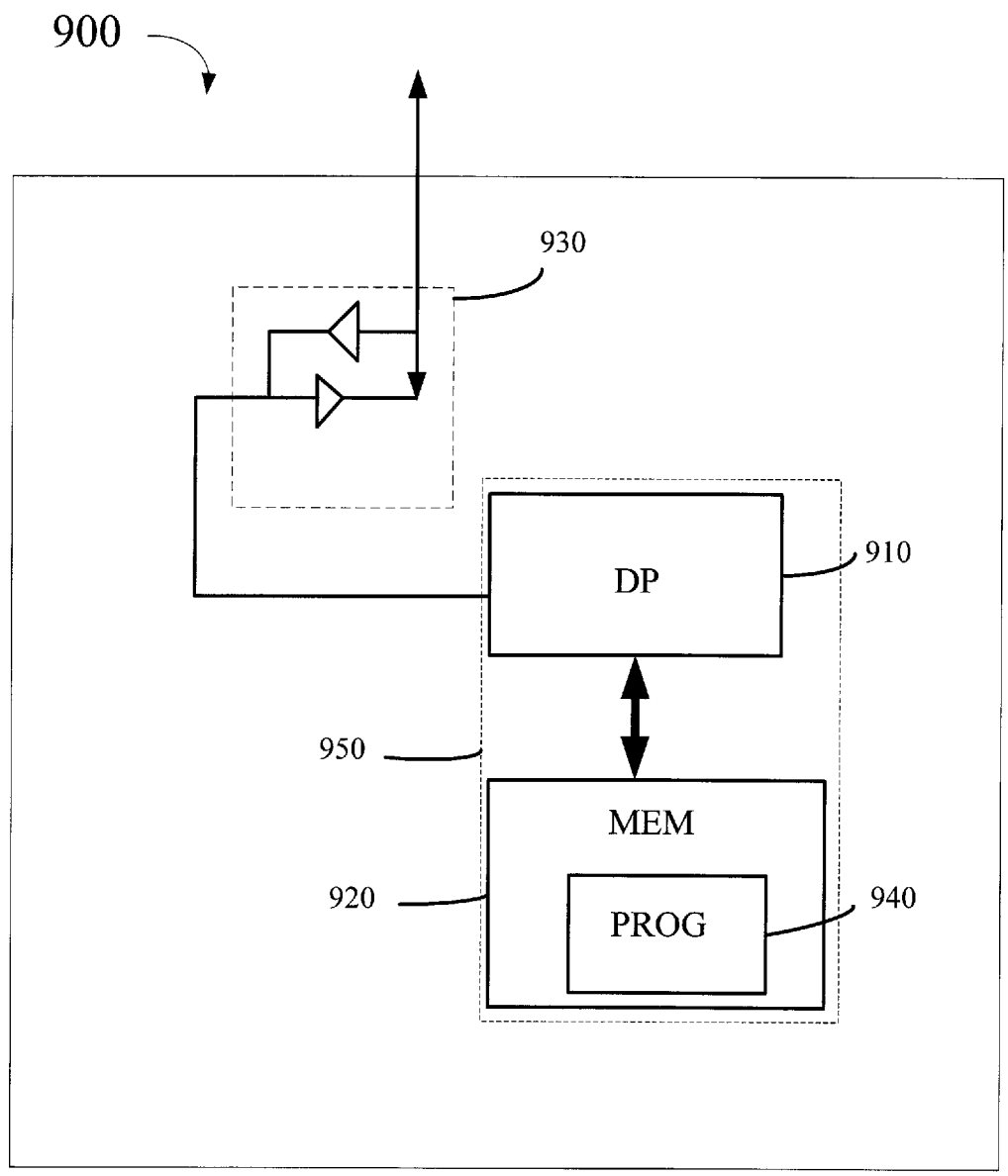
FIG. 9 shows a simplified block diagram 900 of a device that is suitable for use in implementing embodiments of the present disclosure.

FIG. 9 shows a simplified block diagram of a device 900 that is suitable for implementing embodiments of the present disclosure. It would be appreciated that the device 900 may be implemented as at least a part of, for example, the network device 110 120 or the terminal device 130.

As shown, the device 900 includes a communicating means 930 and a processing means 950. The processing means 950 includes a data processor (DP) 910, a memory (MEM) 920 coupled to the DP 910. The communicating means 930 is coupled to the DP 910 in the processing means 950. The MEM 920 stores a program (PROG) 940. The communicating means 930 is for communications with other devices, which may be implemented as a transceiver for transmitting/receiving signals.

In some embodiments where the device 900 acts as a network device, the communicating means 930 may be configured to transmit the data packet. In some other embodiments where the device 900 acts as a terminal device, the processing means 950 may be configured to determine whether triggering a feedback based on one or more of the received data packet, the monitored network devices and a timer Y at the terminal device, and the communicating means 930 may be configured to receive the data packet.

The PROG 940 is assumed to include program instructions that, when executed by the associated DP 910, enable the device 900 to operate in accordance with the embodiments of the present disclosure, as discussed herein with the method 300, 400, 500 or 600. The embodiments herein may be implemented by computer software executable by the DP 910 of the device 900, or by hardware, or by a combination of software and hardware. A combination of the data processor 910 and MEM 920 may form processing means 950 adapted to implement various embodiments of the present disclosure.

The MEM 920 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 900, there may be several physically distinct memory modules in the device 900. The DP 910 may be of any type suitable to the local technical environment, and may include one or more of general purpose computers, special purpose computers, microprocessors, digital signal processors (DSPs) and processors based on multicore processor architecture, as non-limiting examples. The device 900 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. The machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a terminal device, wherein the terminal device is connected to a plurality of network devices, the method comprising:
    receiving a data packet transmitted from the one or more monitored network devices of the plurality of network devices;
    detecting whether at least one of the one or more monitored network devices has channel quality above a pre-defined threshold;
    determining, based on one or more of: the received data packet, the one or more monitored network devices and a timer Y at the terminal device, whether a feedback should be triggered;
    starting the timer Y after the data packet is received from one of the one or more monitored network devices, wherein a value of the timer Y is set based on a buffer size of the one or more monitored network devices; and
    sending the feedback to the at least one of the one or more monitored network devices having the channel quality above the pre-defined threshold.

2. The method according to claim 1, further comprising:
    before receiving the data packet transmitted from the one or more monitored network devices, receiving a message from the one or more monitored network devices indicating information of the one or more monitored network devices which will transmit the data packet to the terminal device.

3. The method according to claim 1, further comprising: in response to detecting that the timer Y has expired, triggering the feedback.

4. The method according to claim 1, further comprising: monitoring one or more network devices of the plurality of network devices, wherein the one or more monitored network devices include network devices indicated by a network to the terminal device via signaling as for an initial transmission or network devices to which the terminal device has sent Negative ACKnowledgment (NACK) for re-transmission.

5. The method according to claim 4, further comprising: in response to detecting that the data packet has been received from all of the one or more monitored network devices by the terminal device, triggering the feedback.

6. The method according to claim 1, further comprising: in response to detecting that the data packet has been received correctly, triggering the feedback.

7. The method according to claim 1, further comprising: in response to determining that the feedback should be triggered, where the feedback is Negative ACKnowledgement (NACK), sending the NACK feedback when an added latency due to Hybrid Automatic Repeat Request (HARQ) Round Trip Time (RTT) is allowable as the added latency is still within overall latency requirement.

8. The method according to claim 1, further comprising: in response to determining that the feedback should be triggered, where the feedback is Negative ACKnowledgement (NACK), sending the NACK feedback when the one or more monitored network devices have the channel quality which is above the pre-defined threshold.

9. The method according to claim 1, further comprising: in response to determining that the feedback should be triggered, where the feedback is ACKnowledgement (ACK), sending the ACK feedback when enough uplink (UL) resource is available, which is indicated by the one or more monitored network devices to the terminal device.

10. The method according to claim 1, further comprising: in response to determining that the feedback should be triggered, where the feedback is ACKnowledgement (ACK) or Negative ACKnowlededement (NACK) feedback, sending the ACK or the NACK feedback to the one or more monitored network devices having the channel quality above the pre-defined threshold.

11. A terminal device, comprising:
a receiving unit configured to receive a data packet transmitted from the one or more monitored network devices of a plurality of network devices, wherein at least one of the one or more monitored network devices are detected to have a channel quality above a pre-defined threshold;
a determining unit configured to determine, based on one or more of: the received data packet, the one or more monitored network devices, and a timer Y at the terminal device, whether a feedback should be triggered, wherein the timer Y starts after the data packet is received from one of one or more monitored network devices and wherein a value of the timer Y is set based on a buffer size of the one or more monitored network devices; and
a sending unit configured to send the feedback to the at least one of the one or more monitored network devices having the channel quality above the pre-defined threshold.

12. The terminal device according to claim 11, wherein the receiving unit is further configured to:
before receiving the data packet transmitted from the one or more monitored network devices, receive a message from the one or more monitored network devices indicating information of the one or more monitored network devices which will transmit the data packet to the terminal device.

13. The terminal device according to claim 11, further comprising a monitoring unit configured to monitor one or more network devices of the plurality of network devices, wherein the one or more monitored network devices include network devices indicated by a network to the terminal device via signaling as for an initial transmission or network devices to which the terminal device has sent Negative ACKnowledgment (NACK) for re-transmission.

14. The terminal device according to claim 11, further comprising a triggering unit configured to trigger the feedback in response to one of: detecting that the timer Y has expired, detecting that the data packet has been received from all of the one or more monitored network devices by the terminal device, and detecting that the data packet has been received correctly.

15. The terminal device according to claim 11, wherein the sending unit further configured to:
send Negative ACKnowledgment (NACK) feedback, wherein the triggering unit triggers the feedback and the feedback is NACK, when an added latency due to Hybrid Automatic Repeat Request (HARQ) Round Trip Time (RTT) is allowable as the added latency is still within overall latency requirement; or
send Negative ACKnowledgement (NACK) feedback, wherein the triggering unit triggers the feedback and the feedback is NACK, when the one or more monitored network devices have channel quality which is above a pre-defined threshold; or
send ACKnowledgement (ACK) feedback, wherein the triggering unit triggers the feedback and the feedback is ACK, when enough uplink (UL) resource is available, which is indicated by the one or more monitored network devices to the terminal device.

16. The terminal device according to claim 15, wherein the sending unit is further configured to send the ACK or the NACK feedback to the one or more monitored network devices having the channel quality above the pre-defined threshold.

17. A terminal device, comprising:
a processor and a storage medium, the storage medium containing instructions that, when executed on the processor, cause the terminal device to:
receive a data packet transmitted from one or more monitored network devices of a plurality of network devices, wherein at least one of the one or more monitored network devices are detected to have a channel quality above a pre-defined threshold;
determine, based on one or more of: the received data packet, the one or more monitored network devices, and a timer Y at the terminal device, whether a feedback should be triggered;
start the timer Y after the data packet is received from one of the one or more monitored network devices, wherein a value of the timer Y is set based on a buffer size of the one or more monitored network devices; and send the feedback to the at least one of the one or more monitored network devices having the channel quality above the pre-defined threshold.

18. The terminal device according to claim 17, wherein instructions that, when executed on the processor, further cause the terminal device to:

before receiving the data packet transmitted from the one or more monitored network devices, receive a message from the one or more monitored network devices indicating information of the one or more monitored network devices which will transmit the data packet to the terminal device.

* * * * *